UNITED STATES PATENT OFFICE.

JOHN F. STEPHENSON, OF ALBANY, NEW YORK.

INCRUSTATION-PREVENTIVE.

SPECIFICATION forming part of Letters Patent No. 454,083, dated June 16, 1891.

Application filed August 10, 1889. Serial No. 320,407. (No specimens.)

*To all whom it may concern:*

Be it known that I, JOHN F. STEPHENSON, of the city of Albany, county of Albany, and State of New York, have invented a new and useful Improvement in Compounds for Removing and Preventing Boiler-Scales, of which the following is a specification.

My compound consists of the following ingredients, combined in about the proportions stated, namely: bicarbonate of soda, five hundred and twenty-five (525) pounds; Glauber's salt, one hundred and twenty-five (125) pounds; sal-soda, seventy-five (75) pounds; common salt, two hundred and twenty-five (225) pounds; potash, fifty (50) pounds; and it is used for the purpose of removing scale from the inner sides of steam-boilers and for preventing incrustation and the formation of scale on the same.

The following is the preferable manner of making my compound: The bicarbonate of soda and the salt are first mixed, then the Glauber's salt is added and mixed, and then the sal-soda. This mixture is thoroughly ground. The potash is ground separately and stirred quickly into the mixture. Unless this last process is rapidly and thoroughly done there is danger of deliquescence. The compound thus prepared is ready for use, and for removing scale is employed by simply dissolving it in water and pumping or otherwise introducing the solution into the boiler.

The quantity of my compound to be used is about four (4) pounds to each ten (10) horse-power boiler capacity. Continue this until the scale is removed, which will generally take from eight to ten days, and during this time the boiler should be blown off and cleaned to remove the scale that is detached and dissolved by the use of my compound. To prevent the formation of scale a smaller quantity—about one-third—will suffice.

The proportions heretofore given of the above-named ingredients are those that ordinarily prevail; but they may be varied to meet the differences in waters of different localities by reducing the number of pounds of the salt or of the bicarbonate of soda, or of both, and increasing the amount of the potash in due proportion.

The solution formed by dissolving my compound in water is in no way injurious to iron, brass, or packing, nor does it cause foaming. Its use after the boiler is cleaned is a preventive against the formation of scale and against incrustation.

I am aware that the several parts of my compound are not new, and that separately or several of them together in various combinations they have been employed for this use; but I am not aware that all of them together in the proportions named have been used.

Having thus described my invention, what I seek to secure by Letters Patent is—

The herein-described compound for removing and preventing the formation of scale in boilers, consisting of bicarbonate of soda, Glauber's salt, sal-soda, common salt, and potash, in the proportions stated, substantially as set forth.

In witness whereof I have hereunto set my hand this 22d day of July, in the year of our Lord 1889.

JOHN F. STEPHENSON.

In presence of—
A. D. FLINT,
A. N. LYKE.